Nov. 22, 1955 — D. W. SORRELL — 2,724,319
VENTILATOR
Filed April 7, 1953
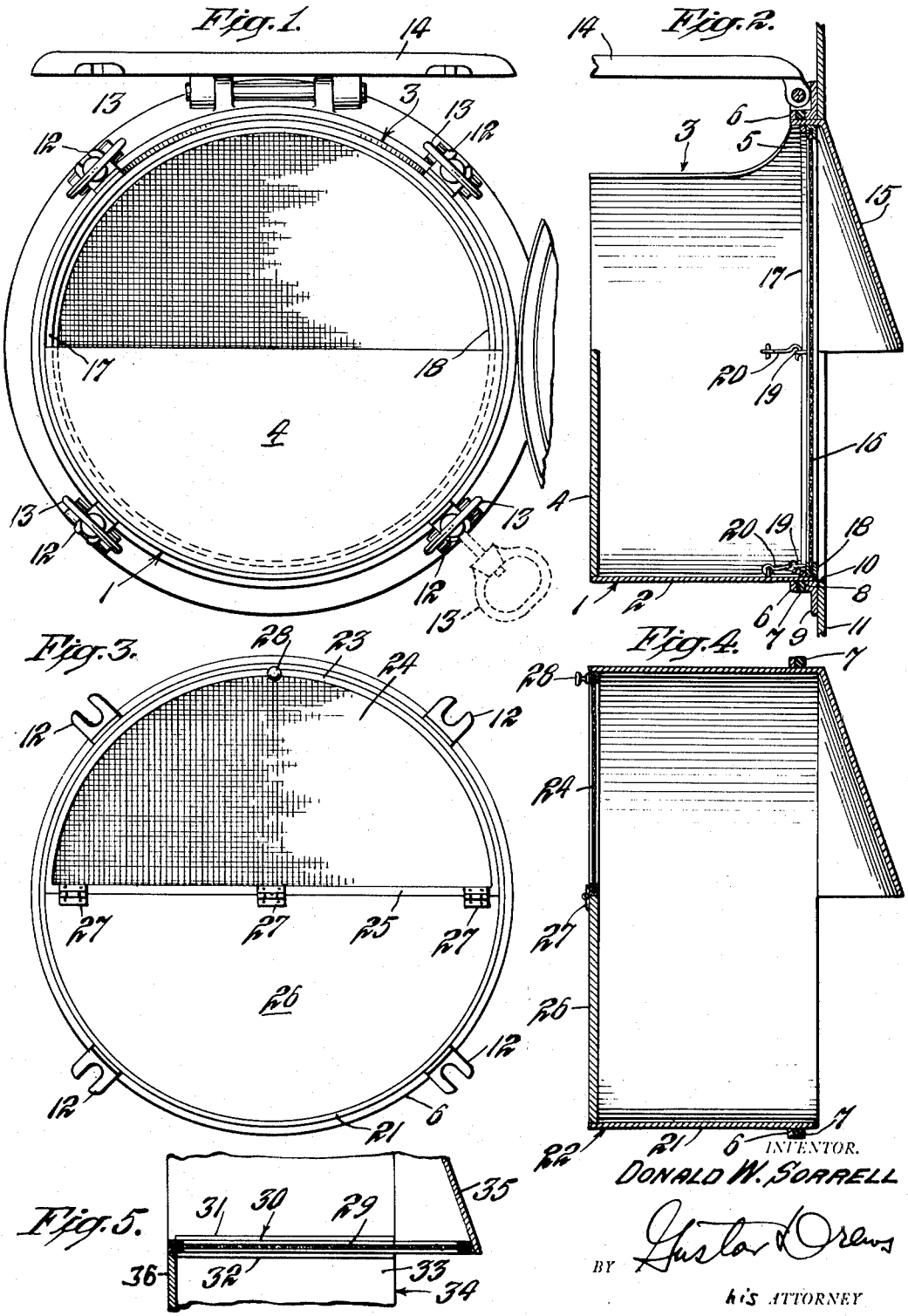
INVENTOR.
DONALD W. SORRELL
BY Gustav Drews
his ATTORNEY

United States Patent Office 2,724,319
Patented Nov. 22, 1955

2,724,319

VENTILATOR

Donald W. Sorrell, Southampton, England, assignor to Daniel J. Mulleavey, New York, N. Y.

Application April 7, 1953, Serial No. 347,304

4 Claims. (Cl. 98—37)

This invention relates to ventilators in general and more especially to ventilators for the portholes of seagoing vessels.

Among the objects of the present invention, it is aimed to provide an improved ventilator particularly adapted for the portholes of seagoing vessels consisting of a drum shaped housing having a visor to shut off the upper part of the inlet from the exterior of the vessel to the drum and deflect rain or water from entering through the upper part of the inlet, but open at the lower part of the inlet of the drum for the free access of air, and in turn having a deflector for the lower part of the outlet of the drum into the interior of the vessel to deflect any of the water that might be blown into the drum through the lower part of the inlet of the drum but open at the upper part of the outlet of the drum for the free passage of the air from the drum into the interior of the vessel, with the drum wall providing a space between the visor and deflector wide enough to allow the free flow of the column of air entering through the inlet of the drum from the exterior of the vessel and passing into the interior of the vessel through the upper part of the outlet from the drum without in any way restricting the passage of the column of air while passing through the drum.

It is still another object of the present invention to provide a ventilator of the character described in which the passage through the drum from the inlet from the exterior of the vessel to the outlet of the drum into the interior of the vessel is intercepted by a screen to obstruct the passage of insects and the like from entering into the interior of the vessel through the drum.

These and other features, capabilities and advantages of the invention will appear from the subjoined detailed description of the specific embodiments thereof illustrated in the accompanying drawings, in which Fig. 1 is a front elevation of one embodiment of the same.

Fig. 2 is a transverse section of the embodiment shown in Fig. 1.

Fig. 3 is a front elevation of another embodiment of the invention.

Fig. 4 is a transverse section of the embodiment shown in Fig. 3.

Fig. 5 is a fragmental section of a third embodiment.

In the embodiment shown in Figs. 1 and 2 there is provided a drum 1 having an interrupted cylindrical wall 2 that has an opening 3 in the upper part thereof to afford access into the interior of the vessel from the drum 1. The inner edge of the wall 2 has connected to substantially the lower half thereof the plane substantially semi-circular wall or deflector 4 constituting a deflector leaving the upper half of the rear or inner end of the drum open and as a continuation of the opening 3. The outer or front portion of the wall 2 continues all around the drum to form a complete cylindrical portion 5 having an annular rib 6 spaced from the outer free edge of the wall 2 against which in the present instance there is positioned the yieldable annulus 7 composed of rubber or the like to contact the inner face 8 of the annular frame 9 secured to the inside of the outer edge of the porthole 10 formed in the wall 11 of the vessel. The frame 9 has the conventional bifurcations 12, four being shown in the present instance, to receive the conventional dogs 13. Furthermore, the frame 9 may also have hinged thereto the conventional cover 14.

The upper and outer edge of the wall 2 has secured thereto the visor 15 which inclines outwardly in a downward direction with the lower edge of the visor disposed in an imaginary plane extending through the horizontal level of the upper edge of the deflector or wall 4. As shown in Fig. 2, in order to accommodate a screen 16 as a protection against insects and the like, there is provided an inwardly extending annular rib 17 spaced from the inner edge of the visor 15 a distance corresponding to the width of the annular frame 18 of the screen 16 which is preferably provided with one or more eyes 19 to receive the hooks 20 secured to the inner face of the wall 2.

To facilitate handling the ventilator so that it may readily be removed and inserted at will by the attendant or even a passenger, it may be composed of aluminum or other light weight, rust resisting material, and the screen 16 composed of some suitable durable plastic material, or the like, rust resisting material. It is obvious that materials other than aluminum for the drum 1, or plastic material for the screen 16, immune to salt water, can be used without departing from the spirit of the invention.

In the use of this ventilator, it will of course appear that when traveling in the warmer climates or during the warmer weather, and particularly when tying up at a wharf in a warm climate or during warm weather, the ventilator can be quickly installed and again removed when the cover 14 is required to be closed, and that in use, the rain, if any, striking the outer faces of the visor 15 will be deflected, and should any water be blown in through the lower part of the inlet, it will in turn be intercepted by the deflector 4 and thus obstruct its entrance into the interior of the vessel. The screen 16 covering as it does the entire cross-sectional area of the drum 1, when inserted, will intercept insects and the like from passing through the drum. It will also appear that the screen 16 will materially obstruct the water and spray that may be blown into the drum 1 below the visor 15 and that this obstruction will materially increase as the fineness of the mesh is increased.

The embodiment shown in Figs. 3 and 4 differs from the embodiment shown in Figs. 1 and 2 primarily in that it has a continuous complete cylindrical wall 21 for the drum 22, and as a result affords an abutment for the upper arcuate frame portion 23 of the screen 24, the lower straight frame portion 25 of which is hinged to the upper edge of the deflector 26 by hinges 27 to permit swinging the screen 24 inwardly and downwardly when not in use and access is desired to the interior of the drum 22. In screening or operative position the upper edge of the arcuate frame 23 is anchored in position by the conventional spring pressed button 28 entering a recess in the wall 21 of the drum 22.

In the embodiment shown in Fig. 5, instead of the screens 16 or 24, a screen 29 mounted on the frame 30 is slidably mounted between the rails 31 and 32 on opposing faces of the cylindrical wall 33 of the drum 34 to abut at its outer end against the visor 35 and at its inner end to rest on the upper edge of the deflector 36 in closed position and slidable inward into the interior of the vessel away from the visor 35 when access is desired to the interior of the drum 34. The drum 34 in the embodiment illustrated in Fig. 5 might otherwise conform either to the drum 1 of the embodiment illustrated in Fig. 2, or the drum 22 illustrated in the embodiment of Fig. 4.

The widths of the drums 1, 22 and 34, that is, the widths of the cylindrical walls 2, 21 and 33, respectively, in an axial direction, have given excellent results when each approximated one-half the diameter of its drum so that, when the extent of the openings beneath the visors at the outer ends of the drums approximated the extent of the openings above the deflectors at the inner ends of the drums, the column of air passing from the exterior of the vessel through the inlet below the visor will not in any way be restricted before passing into the interior of the vessel through the outlet above the deflector and thus insure a free passage of air through the drum.

It will also appear that particularly with the embodiments illustrated in Figs. 4 and 5, should any water enter the drum, either from rain or by being splashed or blown into the drum, the outer lower edge of the drum being unobstructed will enable the water quickly to flow out with the rolling of the vessel and that the short flange at the lower outer edge of the drum shown in Fig. 2 is so slight that it can be ignored, since with the rolling of the vessel the amount of water that could be collected beyond the flange would be negligible.

It is obvious that various changes and modifications may be made to the details of construction without departing from the general spirit of the invention as set forth in the appended claims.

I claim:

1. In a ventilator for the conventional circular porthole of a seagoing vessel having hingedly mounted securing dogs on the inner face of the vessel adjacent the edge of the porthole, the combination of a housing having an outer end conforming to the porthole in cross section and having bifurcations on the outer face thereof to receive said securing dogs, said housing having a wall extending inwardly from the edge of the porthole and having an inlet at the said outer end, said wall having an inner end, a visor extending down from the upper outer edge of said outer end of the housing and flaring outwardly and downwardly and spaced from the lower edge of said outer end of the housing, the space between said visor and the lower edge of said outer end forming the inlet, a deflector extending up from the lower inner edge of said wall, the upper edge of which deflector being spaced from the upper edge of the housing, the space between the upper edge of said deflector and the upper edge of said housing forming the outlet, a screen extending completely across the interior of the housing from the lower edge of the visor to the upper edge of the deflector, and means for slidably mounting said screen in said housing to enable sliding the same out of said housing to afford access to the interior thereof.

2. In a ventilator for the conventional circular porthole of a seagoing vessel, the combination of a housing having a passage extending therethrough and an open outer end to form an inlet for the passage, said housing being in intimate engagement with the peripheral edge of the porthole and having a wall extending inwardly from the porthole, said wall having an open inner end constituting the outlet for the passage through said housing, a visor extending down from the upper outer edge of said outer end of the housing and flaring outwardly and downwardly and spaced from the lower end of said outer end, a deflector extending up from the lower inner edge of said wall, the upper edge of said deflector being spaced from the upper edge of said wall, the upper edge of said deflector and the lower edge of said visor being in substantial alinement with one another in a horizontal line about midway between the upper edge of said housing and the lower edge of said housing, a screen in engagement with the upper edge of said deflector and extending across the same to, and in engagement with, the lower end of said visor thereby extending completely across the passage through said housing to intercept insects and the like, and means on the inside of said wall slidably receiving said screen to enable sliding said screen inwardly across said deflector to afford access to the interior of the housing.

3. In a ventilator for the conventional circular porthole of a seagoing vessel having hingedly mounted securing dogs on the inner face of the vessel adjacent the edge of the porthole, the combination of a housing having an outer end conforming to the porthole in cross section and having bifurcations on the outer face thereof to receive said securing dogs, said housing having a wall extending inwardly from the edge of the porthole and having an inlet at said outer end, said wall having an inner end, a visor extending down substantially half way from the upper outer edge of said outer end of the housing and flaring outwardly and downwardly and spaced from the lower edge of said outer end of the housing, the space between said visor and the lower edge of said outer end forming the inlet, a deflector extending up from the lower inner edge of said wall substantially to the level of the lower edge of said visor, the upper edge of which deflector being spaced from the upper edge of the housing, the space between the upper edge of said deflector and the upper edge of said housing forming the outlet, the areas of the inlet and outlet approximating one another, and the smallest unobstructed horizontal cross sectional area of the housing from the upper edge of said deflector to said visor being greater than the area of said inlet to enable the free flow of a column of air from the inlet through the housing to the outlet, and a screen extending from the upper edge of the deflector across the air passage in the housing completely intercepting passage of the air flow from the inlet to the outlet.

4. In a ventilator for the conventional circular porthole of a seagoing vessel having hingedly mounted securing dogs on the inner face of the vessel adjacent the edge of the porthole, the combination of a housing having an outer end conforming to the porthole in cross section and having bifurcations on the outer face thereof to receive said securing dogs, said housing having a wall extending inwardly from the edge of the porthole and having an inlet at said outer end, said wall having an inner end, a visor extending down substantially half way from the upper outer edge of said outer end of the housing and flaring outwardly and downwardly and spaced from the lower edge of said outer end of the housing, the space between said visor and the lower edge of said outer end forming the inlet, and a deflector extending up from the lower inner edge of said wall substantially to the level of the lower edge of said visor, the upper edge of which deflector being spaced from the upper edge of the housing, the space between the upper edge of said deflector and the upper edge of said housing forming the outlet, the upper portion of said wall being of reduced width to form a substantial recess adjoining the outlet, the area of said outlet being greater than the area of said inlet, and the smallest horizontal cross sectional area of the housing from the upper edge of said deflector to said visor being greater than the area of said inlet.

References Cited in the file of this patent

UNITED STATES PATENTS

| | | |
|---|---|---|
| 1,256,281 | Ahern | Feb. 12, 1918 |
| 1,272,202 | Bradley | July 9, 1918 |
| 1,340,673 | Roe | May 18, 1920 |
| 2,347,895 | Evans | May 2, 1944 |
| 2,354,795 | Castle | Aug. 1, 1944 |
| 2,362,114 | Carver | Nov. 7, 1944 |